Oct. 3, 1961 S. KOOPAL 3,002,734
SHAFT FURNACE
Filed Aug. 11, 1958
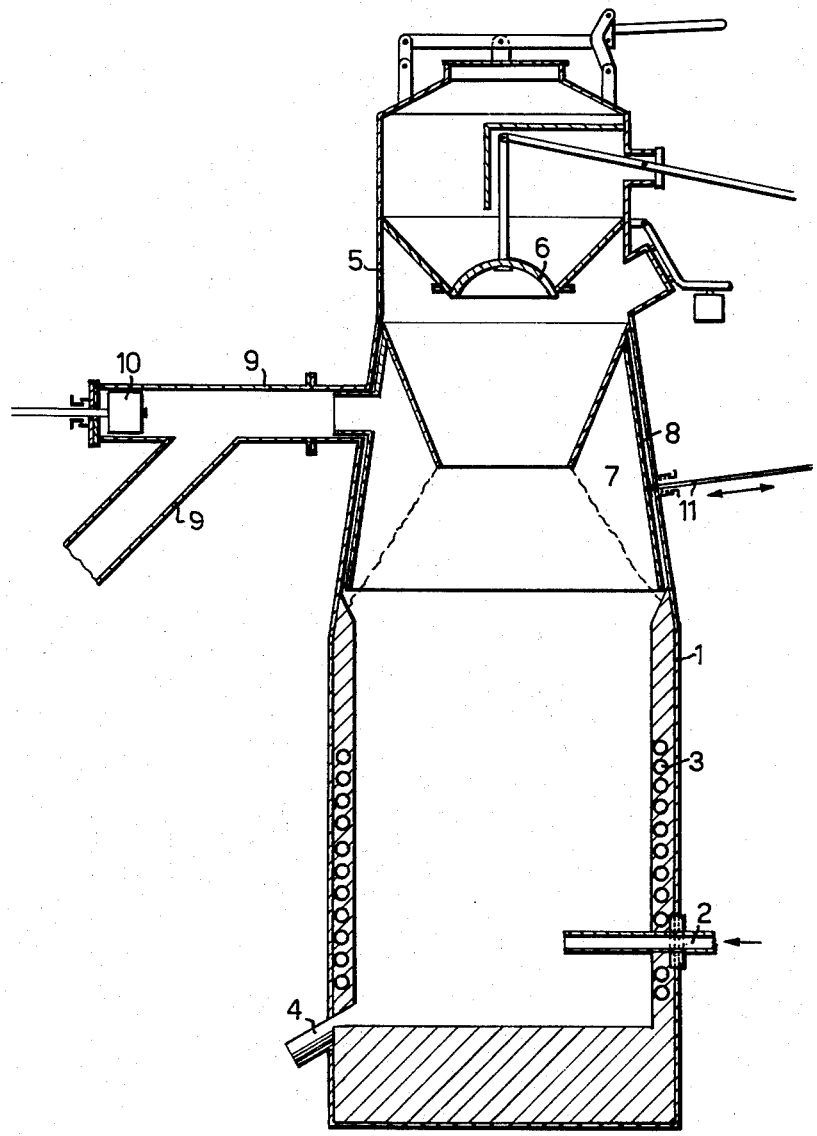
Inventor
Sieds Koopal.
By Cushman, Darby & Cushman
Attorneys United States Patent Office 3,002,734
Patented Oct. 3, 1961

3,002,734
SHAFT FURNACE
Sieds Koopal, Sittard, Netherlands, assignor to
Stamicarbon N.V., Heerlen, Netherlands
Filed Aug. 11, 1958, Ser. No. 754,304
Claims priority, application Netherlands Aug. 21, 1957
1 Claim. (Cl. 263—31)

The present invention relates to shaft furnaces and the use thereof for performing high temperature chemical reactions.

Shaft furnaces are used in the performance of various chemical reactions requiring very high temperatures, say over 2000° C. The high temperature is attained by combustion of coke or other solid fuel with an oxygen-rich blast.

In this way it is possible to obtain, e.g. calcium carbide, ferrosilicon and phosphorus by filling the shaft furnace with a mixture of lime and coke for the preparation of $CaC_2$; with a mixture of iron, gravel and coke for the preparation of ferrosilicon; with a mixture of raw phosphate, gravel and coke for the preparation of phosphorus, and by burning part of the coke with a blast, having an oxygen content of over 50% by volume so that the high temperature may be reached while letting the remainder of the coke take part in the desired chemical reaction. From the bottom of the shaft furnace a melt of $CaC_2$, ferrosilicon or calcium silicate, respectively, is withdrawn, while the gases formed by combustion and chemical reaction (containing the phosphorus in the case of the third example), escape from the top of the furnace.

Due to the high temperature prevailing in the reaction zone or zones of the furnace the ascending gases generally contain solid substances in the gaseous phase, which substances sublime on reaching higher, colder zones, and the deposition may occur in part in the vicinity of the gas discharge chamber. This deposition of solid substances has been found to give rise to interruption in the continuous and regular operation of the shaft furnace. Occasionally blockage or bridging of the charge in the furnace occurs and it has been found that this bridging effect mainly occurs when large lumps of material deposited in the top of the shaft furnace suddenly loosen and fall down. These fallen lumps disturb the composition of the charge in such a way as to interfere with the required continuous operation.

It is an object of the present invention to provide a shaft furnace which may be used without this difficulty arising or at least not to the same extent.

According to the present invention we provide a shaft furnace suitable for use in performing high temperature chemical reactions using a solid fuel and an oxygen-rich blast for combustion thereof to create heat required for the reaction, wherein at least one chamber open at the bottom is located in the shaft for trapping hot rising gases containing components liable to condense higher in the furnace, the said chamber has at least one wall which is movably supported, and means is provided for rapidly shaking said wall during the furnace operation to remove material deposited in the chamber in the solid state.

When a furnace according to the invention is used, obstruction of the charge may be avoided, or substantially so, by shaking the said movable wall continuously or at sufficiently frequent intervals to loosen deposited solid before pieces large enough to cause obstruction have formed.

The invention will be explained with reference to the accompanying drawing which diagrammatically illustrates one shaft furnace according to the invention, selected by way of example only.

The shaft furnace comprises a shaft 1, the steel wall of which is lined on the inside with refractory material. The bottom part of the furnace is provided with one or more burners 2, through which the gasifying agent, the oxygen-rich blast, is supplied. Over the region where the burners are located the wall of the furnace is provided with cooling spirals 3. Near the bottom is a discharge opening 4.

The furnace is filled from a bunker 5 on top of the shaft, the charging hole of which bunker can be closed by a valve 6. Gases rising through the charge when the furnace is in operation are trapped in the chamber 7, which is provided in the shaft, said chamber being outwardly bounded by a thin continuous wall 8 which is more or less parallel with the outer wall of the shaft and is secured at the top only, by a weld between the wall 8 and the inner wall of the chamber. The gases are discharged from the chamber 7 through an opening in the wall 8 into a gas discharge conduit 9. The gas entry portion of this conduit can be kept clean by means of a scraper device 10. A rod 11 extending through a packing box in the outer wall of the shaft is attached to the wall 8 and is associated at its outer end with means for shaking the wall 8, which means may be a vibrating device of very simple design. Very good results were obtained with pneumatic vibrating hammers. The shaking of wall 8 imparts a vibration to the inner wall of the chamber 7.

The effect of vibrating the wall 8 appears from the following experiments made in connection with the preparation of calcium carbide. An experimental furnace was charged with a mixture of coke and limestone, composed of 100 parts by weight of coke, minimum size 40 mm., to 50 parts by weight of limestone. The blast was a mixture of oxygen and steam, having a dew point of 45° C.; the hourly consumption of (tonnage) oxygen was 700 cu. m. After 18 hours the experiment had to be stopped due to bridging of the charge.

However, when a furnace constructed along the lines illustrated was employed and wall 8 of the gas collecting chamber was vibrated—in this particular experiment by means of 3 pneumatic vibrating hammers each of which produced 100 vibrations in ⅓ minute—the furnace was kept in operation without trouble for weeks at a stretch, the rate at which raw carbide was withdrawn being 300 kg. per hour (content: 65% $CaC_2$).

A furnace according to the invention may incorporate more than one chamber for trapping gas; the construction may be such that the entire chamber is movably mounted.

I claim:

A shaft furnace comprising: a shaft having an inlet at its upper end for the admission of solid fuel thereto and a product outlet at the lower end thereof, a combustion zone within said shaft adjacent said outlet end, said zone receiving fuel from said inlet and discharging product through said outlet; means for supplying gas to said combustion zone for combustion of the fuel therein to form said product; means comprising an annular wall member positioned within said shaft and extending longitudinally thereof between said combustion zone and said inlet, said member having a laterally extending gas discharge conduit, the wall of said conduit being spaced from the wall of said shaft and the wall of said member being spaced from the interior wall of said shaft, said member being supported for lateral shaking movement with respect to said shaft; means for shaking the wall of said annular member during operation of said shaft; an inverted truncated member secured at its upper end to the interior wall of said shaft above said gas discharge conduit, said truncated member extending downwardly below said gas discharge conduit, and having a central opening therethrough, said truncated member and said annular wall member defining an annular chamber, whereby upwardly moving hot gases are trapped in the annular chamber and pass out of said shaft through said gas discharge conduit.

References Cited in the file of this patent

UNITED STATES PATENTS

| | | |
|---|---|---|
| 132,892 | Boss | Nov. 12, 1872 |
| 2,222,585 | Riggs | Nov. 19, 1940 |
| 2,572,484 | Howle et al. | Oct. 23, 1951 |
| 2,733,912 | Newcomb et al. | Feb. 7, 1956 |